(12) United States Patent
Sarkisian et al.

(10) Patent No.: US 9,493,685 B2
(45) Date of Patent: Nov. 15, 2016

(54) PRE-TREATMENT COMPOSITION

(75) Inventors: George Sarkisian, San Diego, CA (US); Ali Emamjomeh, San Diego, CA (US); Elizabeth Ann Visnyak, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 560 days.

(21) Appl. No.: 13/641,975

(22) PCT Filed: Feb. 23, 2011

(86) PCT No.: PCT/US2011/025802
§ 371 (c)(1),
(2), (4) Date: Oct. 18, 2012

(87) PCT Pub. No.: WO2011/159371
PCT Pub. Date: Dec. 22, 2011

(65) Prior Publication Data
US 2013/0034656 A1 Feb. 7, 2013

Related U.S. Application Data

(63) Continuation-in-part of application No. 13/639,492, filed as application No. PCT/US2010/038562 on Jun. 14, 2010, now Pat. No. 8,851,652.

(51) Int. Cl.
| C08K 3/16 | (2006.01) |
| C08K 3/28 | (2006.01) |
| B41M 5/00 | (2006.01) |
| C09J 133/08 | (2006.01) |
| C09J 133/10 | (2006.01) |
| C08K 5/098 | (2006.01) |

(52) U.S. Cl.
CPC ........... *C09J 133/08* (2013.01); *B41M 5/0011* (2013.01); *C09J 133/10* (2013.01); *C08K 3/16* (2013.01); *C08K 3/28* (2013.01); *C08K 5/098* (2013.01)

(58) Field of Classification Search
CPC ...... C41M 5/50; C41M 5/52; C41M 5/5218; C41M 5/0011; B41M 5/50; B41M 5/52; B41M 5/5218; B41M 5/0011
See application file for complete search history.

(56) References Cited

U.S. PATENT DOCUMENTS

| 4,600,761 | A | * | 7/1986 | Ruffner et al. ............... 526/270 |
| 4,888,379 | A | * | 12/1989 | Henning .................... C08J 3/03 524/500 |
| 5,635,970 | A | | 6/1997 | Shirota et al. |
| 5,965,257 | A | | 10/1999 | Ahluwalia |
| 6,123,760 | A | * | 9/2000 | Varnell ....................... 106/174.1 |
| 6,207,258 | B1 | * | 3/2001 | Varnell ........................ 428/32.1 |
| 6,740,689 | B1 | | 5/2004 | Lee et al. |
| 6,786,588 | B2 | * | 9/2004 | Koyano et al. ............... 347/100 |
| 6,906,019 | B2 | | 6/2005 | Nitzan et al. |
| 7,105,260 | B2 | | 9/2006 | Terauchi et al. |
| 7,157,504 | B2 | | 1/2007 | Ma et al. |
| 7,354,476 | B2 | | 4/2008 | Beach et al. |
| 8,851,652 | B2 | | 10/2014 | Sarkisian et al. |
| 2002/0192381 | A1 | | 12/2002 | Nitzan et al. |
| 2003/0018101 | A1 | | 1/2003 | Botros et al. |
| 2003/0103129 | A1 | | 6/2003 | Tanaka et al. |
| 2004/0139566 | A1 | | 7/2004 | Szymanski |
| 2005/0274281 | A1 | | 12/2005 | Jackson |
| 2006/0203056 | A1 | | 9/2006 | Furukawa et al. |
| 2007/0056118 | A1 | | 3/2007 | Ellis |
| 2007/0067928 | A1 | | 3/2007 | Ellis |
| 2007/0216742 | A1 | | 9/2007 | Sarkisian et al. |
| 2007/0225401 | A1 | | 9/2007 | Sarkisian et al. |
| 2008/0081160 | A1 | * | 4/2008 | Anderle et al. ............ 428/195.1 |
| 2008/0092309 | A1 | | 4/2008 | Ellis et al. |
| 2008/0108750 | A1 | | 5/2008 | Terada et al. |
| 2009/0219330 | A1 | | 9/2009 | Kiyomoto et al. |
| 2009/0233061 | A1 | | 9/2009 | Irita |
| 2009/0233068 | A1 | | 9/2009 | Irita |
| 2009/0234067 | A1 | | 9/2009 | Kariya |
| 2009/0295892 | A1 | | 12/2009 | Akiyama et al. |
| 2010/0075045 | A1 | | 3/2010 | Kaimoto et al. |
| 2010/0214352 | A1 | | 8/2010 | Tsunoda et al. |
| 2010/0231671 | A1 | * | 9/2010 | Anton et al. .................. 347/101 |
| 2011/0113534 | A1 | * | 5/2011 | Sauer et al. ...................... 2/411 |
| 2012/0314000 | A1 | | 12/2012 | Sarkisian et al. |

FOREIGN PATENT DOCUMENTS

| CN | 101535424 | 9/2009 |
| EP | 1391312 | 2/2004 |
| JP | 2002079739 | 3/2002 |

(Continued)

OTHER PUBLICATIONS

Luo (Microstructure Development in Particulate Composite Coatings by Cryo-SEM. Dissertation: Graduate School of the University of Minnesota, Sep. 2007, p. 101).*
Ashland (Flexbond 325 Technical Data Sheet. Ashland. 2009. 2 pages).*
Air Products (Performance Additives for Coatings, Inks and Adhesives. Air Products. 7 pages, 2003).*
Machine translated English language equivalent of JP 2009-299240 (Dec. 2009, 14 pages).*
International Search Report and Written Opinion for PCT/US2011/025802 dated Nov. 30, 2011 (12 pages).

(Continued)

*Primary Examiner* — Brieann R Fink
(74) *Attorney, Agent, or Firm* — HP Inc. Patent Department

(57) ABSTRACT

Pre-treatment composition and printing method for printing durable images using such pre-treatment composition are disclosed. A disclosed example of the pre-treatment composition includes a liquid vehicle, a polyvalent metal salt, a latex resin and thickener. Moreover, a printing method is also disclosed with an ink composition comprising of an aqueous liquid vehicle and a colorant after pre-treatment with said pre-treatment composition.

17 Claims, No Drawings

(56) References Cited

FOREIGN PATENT DOCUMENTS

| | | |
|---|---|---|
| JP | 2005074655 | 3/2005 |
| JP | 2006159426 | 6/2006 |
| JP | 2008266853 | 11/2008 |
| JP | 2009149774 | 7/2009 |
| JP | 2009/299240 | 12/2009 |
| JP | 2009299240 A * | 12/2009 |
| JP | 2010046945 | 3/2010 |
| JP | 2010069870 | 4/2010 |
| JP | 2011168911 | 9/2011 |
| WO | WO 99/06219 | 2/1999 |
| WO | WO-2008/033569 | 3/2008 |
| WO | WO-2008/052962 | 5/2008 |
| WO | WO-2009/084600 | 7/2009 |
| WO | WO 2009/143233 | 11/2009 |

OTHER PUBLICATIONS

Supplementary European Search Report for S.N. PCT/US2010/038562 dated Aug. 6, 2013 (7 pages).
Supplementary European Search Report for S.N. PCT/US2011/025796 dated Aug. 6, 2013 (9 pages).
Supplementary European Search Report for S.N. PCT/US2011/025802 dated Sep. 2, 2013 (9 pages).
The Notification of the First Office Action for CN Application No. 201080066665.2 dated Oct. 22, 2013.
International Search Report and Written Opinion for PCT/US2010/038562 dated Mar. 31, 2011 (8 pages).
International Search Report and Written Opinion for PCT/US2011/025796 dated Nov. 30, 2011 (9 pages).

* cited by examiner

PRE-TREATMENT COMPOSITION

CROSS REFERENCE TO RELATED APPLICATIONS

This application is a continuation-in-part of U.S. patent application Ser. No. 13/639,492, filed Oct. 4, 2012, which is itself a U.S. National Stage Entry under 35 U.S.C. §371 of International Application Serial No. PCT/US2010/038562, filed Jun. 14, 2010, which application is incorporated by reference herein it its entirety.

BACKGROUND

Inkjet technology has expanded its application to high-speed, commercial and industrial printing, in addition to home and office usage. This technology has become a popular way of recording images on various media surfaces, particularly paper, for a number of reasons, including, low printer noise, capability of high-speed recording and multi-color recording Inkjet printing is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media.

Though there has been great improvement in inkjet printing, improvements are followed by increased demands from consumers specifically regarding higher speeds, higher resolution increased stability, and durability. The ink composition is an important factor that helps to obtain good printing performances. However, in addition to ink composition, a pre-treatment composition can be applied before an ink composition is established on the print recording medium in view of improving printing characteristics and attributes of the image. Such pre-treatment composition is often a substantially colorless liquid that interacts with the colorant and/or with polymeric components of the ink composition to thereby precipitate or, otherwise, fix the ink composition to the print media surface. Pre-treatment formulations are therefore desirable to have more stable and reliable pre-treatment compositions that will produce higher quality print images on the print media surfaces.

DETAILED DESCRIPTION

Before particular embodiments of the present invention are disclosed and described, it is to be understood that the present disclosure is not limited to the particular process and materials disclosed herein. It is also to be understood that the terminology used herein is used for describing particular embodiments only and is not intended to be limiting, as the scope of the present invention will be defined only by the claims and equivalents thereof. In describing and claiming the present exemplary composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. Wt % means herein percentage by weight. All percents are by weight unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

In some embodiments, the present disclosure refers to a pre-treatment composition that includes a liquid vehicle, a polyvalent metal salt as fixing agent, a latex resin and a thickener. In some other embodiments, the disclosure refers to a method for printing durable images onto a porous recording medium. Such method includes applying a pre-treatment composition onto a porous recording medium said pre-treatment composition including a liquid vehicle, a polyvalent metal salt as fixing agent, a latex resin and a thickener. An ink composition, containing an aqueous liquid vehicle and a colorant, is then applied onto the recording medium. In some examples, the ink composition overprints said pre-treatment composition. In some embodiments, the pre-treatment composition is applied onto said recording medium using coating devices and said the ink composition is jetted onto said recording medium via inkjet nozzles.

It is admitted that the pre-treatment composition, upon contact with ink, may cause the colorants present in the ink formulation to precipitate out and result in the enhancement of image quality attributes, as for example, optical density, chroma, and durability. Indeed, without being linked by any theory, it is believed that after the pre-treatment composition is overprinted with the ink composition on the substrate or, in other words, when ink and pre-treatment composition meet on the media surface, an effective immobilization of ink colorants is realized and nearly all the colorants are deposited on the surface of the media rather than penetrating the media and depositing below the surface. Concurrently, the pre-treatment composition vehicle, upon mixing with the ink vehicle, becomes highly wetting and the mixed vehicle quickly penetrates the media, leaving the colorants behind. Within such printing method, the combination of pre-treatment composition and ink composition provide high quality and durable image prints. The use of the pre-treatment composition such as disclosed herein results thus in the enhancement of image quality attributes while enabling variable and high-speed printing. In addition, the pre-treatment composition is a stable composition, meaning thus that the pre-treatment composition does not present stability problems over time.

In some example, the ink composition overprints the pre-treatment composition. Such printing method results in printed media that have an improved durability, as well as reduce bleeding and coalescence issues. As durability improvement, it is meant herein that the use of pre-treatment composition provides robustness to dry finishing as well as durability. In addition, the image forming method described herein produces printed images of high quality and enables high-speed printing.

In some examples, the pre-treatment composition helps to maintain the good print attributes of inkjet system by providing a good wet on wet mixing with the ink in view of capturing the ink in a durable film. Indeed, the pre-treatment composition, that demonstrates rheological control of surface tension and viscosity, is able to slow down the penetration of the pre-treatment fluid allowing, thus, enough fluid to remain near the porous media surface for reaction with the ink composition. By remaining on the surface of the porous media, the pre-treatment composition is able to react with the pigment particles present in the ink composition and is able to form a durable, water resistant print.

In some embodiments, the pre-treatment composition, for use in a method for printing durable images, contains a liquid vehicle, a polyvalent metal salt as fixing agent, a latex resin and a thickener. In some examples, the pre-treatment composition has a viscosity within the range of about 100 to about 10000 cps; in other examples, of about 200 to about 5000 cps; and, in yet other examples, the pre-treatment composition has a viscosity within the range of about 1 000 to about 4000 cps. Such viscosity is measured at 25° C., using a Brookfield Viscometer.

In some examples, the pre-treatment composition has a surface tension in the range of about 25 to about 45 dynes/cm and, in some other examples, in the range of about 30 to about 40 dynes/cm. A method for measuring the viscosity of liquid is described in detail in JIS Z8803. The viscosity can be easily measured using a commercially available viscometer. Examples of viscometer include a B-type viscometer and an E-type viscometer (rotation-type, manufactured by Tokimec Inc.). The viscosity is herein measured using a vibration-type VM-100A-L (manufactured by Yamaichi Electronics Co., Ltd.) and is used at 25° C. The surface tension means both dynamic surface tension and static surface tension. Either is measured at 25° C. The surface tension is adjusted using, for example, nonionic surfactants or the like. A method for measuring static surface tension includes a capillary rise method, a drop method and/or a ring method. The Wilhelmy plate method could also be used as a static surface tension measuring method. Examples of method for measuring dynamic surface tension include oscillating jet method, falling meniscus method, a maximum bubble pressure method, and the like. Such method are described in, for example, "Shin Jikken Kagaku Koza, Dai 18 kan, Kaimen to Koroido (New Course of Experimental Chemistry, Vol. 18, Interface and Colloid)", Maruzen, p. 69-90, 1977. A differential bubble pressure method could also be used as the dynamic surface tension measuring method. Without being linked by any theory, it is believed that within such viscosity and surface tension, the pre-treatment composition does not penetrate the media too fast and allows the fluid to remain near the media surface and enabling therefore the reaction of the pre-treatment composition with the ink composition. The pretreatment fluid will thus be able to precipitate with the colorants of the ink composition. Such viscosity and surface tension of the composition facilitate the wet on wet printing mechanism.

In some embodiments, the pre-treatment composition, used in the printing method such as defined herein, include latex resin components. The latex resin can be a cationic, an anionic or an amphoteric polymeric latex resin. In some examples, the latex resin is an anionic polymeric latex resin. The term latex refers herein to a group of preparations consisting of stable dispersions of polymeric micro-particles dispersed in an aqueous matrix. In some examples, the latex resin is present, in the composition, in the form of dispersed latex resin particles. In some embodiments, the pre-treatment composition contains a latex resin having an acid number of less than 20. In some other embodiments, the latex resin has an acid number of less than 18. As used herein, the acid number (AN) refers to the number that has been measured by conductivity titration of the latent acid functions of the latex resin with nitric acid. As an example, the sample is made strongly basic with KOH then is titrated with 1% of $HNO_3$. The pH and conductivity curves are measured simultaneously.

In some examples, the latex resin has a glass transition temperature (Tg) ranging from −22° C. to +20° C. In some other examples, the latex resin has a glass transition temperature (Tg) ranging from −3° C. to +7° C. The way of measuring the glass transition temperature (Tg) parameter is described in, for example, Polymer Handbook, 3rd Edition, authored by J. Brandrup, edited by E. H. Immergut, Wiley-Interscience, 1989. Without being linked by any theory, it is believed that these Tg help to have to provide adequate wet-on-wet mixing of the pretreatment fluid and of the inkjet ink by modulating the film forming rate of the resin/ink mixture. In some embodiments, the latex resin, present in the pre-treatment composition, has a glass transition temperature ranging from −22° C. to +20° C. and has an acid number of less than 20. In some other embodiments, the latex resin has a glass transition temperature ranging from −3° C. to +7° C. and has an acid number of less than 20.

In some examples, the latex resin is a resin made of polymer and copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In some other examples, the latex resin component is a latex containing particles of a vinyl acetate-based polymer, an acrylic polymer, a styrene polymer, an SBR-based polymer, a polyester-based polymer, a vinyl chloride-based polymer, or the like. In yet some other examples, the latex resin is a polymer or a copolymer selected from the group consisting of acrylic polymers, vinyl-acrylic copolymers and acrylic-polyurethane copolymers. The latex resin may have an average molecular weight (Mw) of about 5,000 to about 500,000. In some examples, the latex resin has an average molecular weight (Mw) ranging from about 150,000 to about 300,000. In some other examples, the latex resin has an average molecular weight of about 250,000. The average particle diameter of the latex resin particles can be from about 10 nm to about 1 μm; in some other examples, from about 10 to about 500 nm; and, in yet other examples, from about 50 nm to about 250 nm. The particle size distribution of the latex is not particularly limited, and either latex having a broad particle size distribution or latex having a mono-dispersed particle size distribution may be used. It is also possible to use two or more kinds of polymer fine particles each having a mono-dispersed particle size distribution in combination.

In some examples, the latex resin is present in the pre-treatment composition in an amount representing from about 1 to about 70 wt % of the total weight of the pre-treatment composition. In some other examples, the latex resin is present in an amount representing from about 10 to about 60 wt % of the total weight of the pre-treatment composition. In yet some other examples, the latex resin is present in an amount representing from about 20 to about 50 wt % of the total weight of the pre-treatment composition. The latex resin components may include, but is in no way limited to latex resin sold under the name Hycar® or Vycar® (from Lubrizol Advanced Materials Inc.); Rhoplex® (from Rohm & Hass company); Neocar® (from Dow Chemical Comp); Aquacer® (from BYK Inc) or Lucidene® (from Rohm & Haas company).

In some examples, the pre-treatment composition includes, as a fixing agent, a polyvalent metal salt. The polyvalent metal salt component can be a divalent or a higher polyvalent metallic ion and anion. In some examples, the polyvalent metal salt component is soluble in water. Examples of polyvalent metallic ions include divalent metallic ions, such as $Ca^{2+}$, $Cu^{2+}$, $Ni^{2+}$, $Mg^{2+}$, $Zn^{2+}$ and $Ba^{2+}$; trivalent metallic ions, such as $Al^{3+}$, $Fe^{3+}$ and $Cr^{3+}$. In some other examples, the polyvalent metallic ion is selected from the group consisting of $Ca^{2+}$, $Mg^{2+}$ or $Zn^{2+}$. In yet some other examples, the polyvalent metallic ions are $Ca^{2+}$. Examples of anions include $Cl^-$, $I^-$, $Br^-$, $NO_3^-$ or $RCOO^-$ (where R is H or any hydrocarbon chain). The polyvalent metal salt anion can be a chloride ($Cl^-$) or acetate ($CH_3COO^-$). In some examples, the polyvalent metal salt is composed of divalent or polyvalent metallic ions and of nitrate or carboxylate ions. The carboxylate ions are derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid. In some examples, the fixing agent is a polyvalent metal salt selected from the group consisting of calcium chloride, calcium nitrate, magnesium nitrate, magnesium acetate or zinc acetate. In some other examples, the polyvalent metal salt is calcium chloride or calcium nitrate ($CaCl_2$ or $Ca(NO_3)_2$). In yet some other examples, the polyvalent metal salt is calcium chloride ($CaCl_2$).

The fixing agent can be present in the pre-treatment composition in an amount representing from about 1 to about 20 wt % of the total weight of the pre-treatment composition. In some other examples, the fixing agent is present in an amount representing from about 3 to about 15 wt % of the total weight of the pre-treatment composition. In yet some other examples, the fixing agent is present in an amount representing from about 7 to about 9 wt % based on the total weight of the pre-treatment composition.

In some embodiments, the pre-treatment composition includes a thickener. As thickener, it is meant herein any component that is able to modify the viscosity of the composition, i.e. a viscosity modifier. In some examples, the thickener can be a synthetic thickener or a natural derivative thickener. Non-limiting examples of synthetic thickeners include polyvinyl alcohol, polyacrylamide, polyacrylic acids and alkali soluble emulsion (such as acrylic and styrene maleic emulsion). Non-limiting examples of natural derivative thickeners include cellulose ethers (such as CMC, MC, HEC, EHEC), polysaccharides and/or protineacious thickeners. The thickener can be a synthetic polymer-type thickening agent. Such synthetic polymer-type thickening agent can be prepared by a polymerization reaction of a methacrylic acid, a methacrylic ester, and/or a saturated aliphatic carboxylic acid vinyl ester. Examples of methacrylic esters include methyl methacrylate, ethyl methacrylate, propyl methacrylate, isopropyl methacrylate, butyl methacrylate, n-amyl methacrylate, sec-amyl methacrylate, hexyl methacrylate, lauryl methacrylate, stearyl methacrylate, ethylhexyl methacrylate, crotyl methacrylate, cinnamyl methacrylate, oleyl methacrylate, ricinoleyl methacrylate, hydroxyethyl methacrylate, or hydroxypropyl methacrylate. Examples of aliphatic carboxylic acid vinyl esters include vinyl acetate, vinyl propionate, vinyl butylate, ter-vinyl butylate, vinyl caprylate, vinyl stearate, vinyl laurate, or vinyl oleate. In some examples, an acryl emulsion copolymer viscosity modifier is prepared by emulsion-polymerizing acrylic acid or methacrylic acid. Alkyl acrylate or alkyl methacrylate, hydrophobic group-containing ethoxylated ester of acrylic acid or methacrylic acid, and polyethylenically unsaturated monomer are also suitable for use herein. In some other examples, copolymers, which are a reaction product of various monomers including methacrylic acid, ethyl acrylate, copolymerizable ethylenically unsaturated monomer, and polyethylenically unsaturated monomer, are also suitable. The thickener can be methacrylic acid, a methacrylic or an acrylic ester of an alcohol, a vinyl ester, or a surface-active unsaturated ester. Examples of thickener include alkali-swellable acrylic thickeners, such as Acrysol® Ase-60 (available from Rohm & Haas), Acrysol® Ase-75, Rheolate® 450 and Rheolate® 420, and associative thickeners, such as Elementis Rheolate® 255 (available from Rheox International Inc). Other examples of thickener include copolymer prepared by condensing a polyhydric alcohol with a monoethylenically unsaturated monoisocyanate such as, for example, Rheolate® 210, Rheolate® 216 and Rheolate® 212 (available from Rheox International Inc). Other commercially available thickeners may be found under the trade names Optiflo®, Drewthix®, Ucar®, Polyphobe®, Rheotech®, Texipol®, Coapur®, etc. In some embodiments, the thickener is Rheolate® 212. In some examples, the thickener (also called viscosity modifier) is present in the pre-treatment composition in an amount ranging from about 0.01% to about 2% by weight and in some other examples, in an amount ranging from about 0.05% to about 1% by weight, based on the total weight of the pre-treatment composition. In some examples, the thickener will provide to the pre-treatment composition Newtonian viscosity under high shear.

In some embodiments, the pre-treatment composition may include a defoamer (or defoaming agent). Any known defoamer can be employed in the pre-treatment composition according to the present disclosure. In some examples, such defoaming agents can be nonionic surfactants, such as acetylene glycol-based surfactants and/or polyether denatured siloxane surfactants. Examples of acetylene glycol-based surfactants include 2,4,7,9-tetramethyl-5-decyne-4,7-diol, 3,6-dimethyl-4-octyne-3,6-diol, and 3,5-dimethyl-1-hexyne-3-ol. Alternatively, it may be any of commercially available products, such as Surfynol® 104, 82, 465, 485, and TG available from Air Products Co., and Olfin® STG and Olfin® E1010 manufactured by Nissin Chemical Industry Co. Further examples of polyether denatured siloxane-based surfactants include BYK-345®, BYK-346®, BYK-347®, BYK-348®, and UV3530® of Byk Co. Other non-limiting examples of the defoamer include Surfynol® DF-659, Surfynol® DF-58, Surfynol® DF-66 (all from Air Products), Foamaster® (from Henkel) BYK®-019, BYK®-021, BYK®-022, BYK®-025 (all from Byk Co.), and Dee Fo 215, Dee Fo XRM-1547A (all from Ultra Additives). In some examples, the defoaming agents are dispersions of mineral oil in paraffin solvents, such as Surfynol® 210 and/or Surfynol® 220 available from Air Products Co. In some examples, the defoamer is present in the pre-treatment composition in an amount ranging from about 0.01% to about 2% by weight and in some other examples, in an amount ranging from about 0.05% to about 1% by weight, based on the total weight of the pre-treatment composition.

In some examples, the pre-treatment composition contains surfactants. Non-limiting examples of suitable surfactants include nonionic surfactant, cationic surfactant and combinations thereof. In some other examples, the surfactants are nonionic surfactants. In yet some other examples, the surfactants are nonionic surfactants selected from the group consisting of nonionic fluorosurfactant, nonionic acetylenic diol surfactant, nonionic ethoxylated alcohol surfactant and combinations thereof. In a non-limitative example, the pre-treatment composition contains nonionic ethoxylated alcohol surfactant. Several commercially available nonionic surfactants may be used in the formulation of the pre-treatment composition, examples of which include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), manufactured by Air Products Co; fluorinated surfactants, such as those from the Zonyl® family (e.g., Zonyl® FSO and Zonyl® FSN surfactants), manufactured by E.I. DuPont de Nemours; fluorinated PolyFox® nonionic surfactants (e.g., PF159 nonionic surfactants), manufactured by Omnova, or combinations thereof. Suitable cationic surfactants that may be used in the pre-treatment composition include long chain amines and/or their salts, acrylated diamines, polyamines and/or their salts, quaternary ammonium salts, polyoxyethylenated long-chain amines, quaternized polyoxyethylenated long-chain amines, and/or combinations thereof. Surfactants can be present in the pre-treatment composition in an amount up to about 1.5 weight percentage (wt %). As a non-limiting example, surfactants are present in an amount up to about 1 wt %. In still another non-limiting example, the surfactants are present in an amount ranging from about 0.1 wt % to about 0.6 wt %. In some examples, if the surface tension of the pre-treatment composition is low enough, said composition does not contain surfactants.

In some examples, the pre-treatment composition includes an aqueous vehicle. The term "aqueous vehicle," as defined herein, refers to the aqueous mix in which the fixing agent is placed to form the pre-treatment composition. Examples of suitable aqueous vehicle components include, but are not limited to, water, co-solvents, surfactants, additives (corrosion inhibitors, salts, etc.), and/or combinations thereof. In some examples, the aqueous vehicle includes a water soluble organic co-solvent, a surfactant, and water. Non-limiting examples of the water soluble organic co-solvent include 2-ethyl-2-hydroxymethyl-1,3-propanediol, glycerol propoxylate, tripropylene glycol, 1-(2-hydroxyethyl)-2-pyrrolidinone, 1-(2-hydroxyethyl)-2-imidazolidinone, and/or combinations thereof. Examples of other suitable solvents include amine-N-oxide, ethylene glycol, diethylene glycol, triethylene glycol, 1-propoxy-2-propanol (commercially available as Dowanol® PNP from The Dow Chemical Co., Midland, Mich.), and combinations thereof. In some examples, an organic co-solvent is present in the pre-treatment composition in an amount up to about 25 wt %; in some other examples, in an amount of from about 0 wt % to about 20 wt %. One or more additives may also be incorporated into the pre-treatment composition. As used herein, the term "additive" refers to a constituent of the fluid that operates to enhance performances, environmental effects, aesthetic effects, or other similar properties of the composition. Non-limiting examples of suitable additives include biocides, sequestering agents, chelating agents, anti-corrosion agents, dyes, optical whiteners, brighteners, and/or combinations thereof. In some examples, the pre-treatment composition includes a marker dye such as, for example, Basic Violet 16 (BV 16). The additives can be present, in the pre-treatment composition, in an amount ranging from about 0.01 wt % to about 1 wt %.

In some embodiments, a method for printing durable images onto a porous recording medium includes applying the pre-treatment composition, such as defined above, onto a porous recording medium and applying an aqueous ink composition onto said recording medium. Said ink composition includes an aqueous liquid vehicle and a colorant. In some example, the ink overprints the pre-treatment composition. Such printing method results in printed media that have an improved durability, as well as reduce bleeding and coalescence issues. As durability improvement, it is meant herein that the use of pre-treatment composition provides robustness to dry finishing as well as wet durability. In addition, the image forming method described herein produces printed images of high quality and enables high-speed printing. The recording medium (or substrate) used in the printing method defined herein is a porous media. By "porous media", it is meant herein that the recording medium, or recording substrate, presents an overly porous structure that may absorb the majority of the ink composition. In some examples, the porous recording medium encompasses a high volume of voids and has excellent liquid-absorbing capacity. In some other examples, the recording medium is paper. The porosity can come from the porosity of the coating structure deposited onto the base substrate of the media or from the media per se. The porosity of the recording medium might be represented by air permeance, in the range of from 15 to 40 Sheffield unit Parker Print-Surf testers.

The method can include depositing a pre-treatment composition on a porous recording medium, then jetting an aqueous ink composition that will react with the pre-treatment composition liquid. In some examples, the method for printing durable images is an inkjet printing method. By inkjet printing method, it is meant herein a method wherein a stream of droplets of ink is jetted onto a recording substrate or medium to form the desired printed image. The ink composition may be established on the recording medium via any suitable inkjet printing technique. Examples of inkjet method include methods such as a charge control method which uses electrostatic attraction to eject ink, a drop-on-demand method which uses vibration pressure of a piezo element, an acoustic ink jet method in which an electric signal is transformed into an acoustic beam and ink is irradiated with the acoustic beam so as to be ejected by radiation pressure, and a thermal inkjet method which uses pressure caused by bubbles formed by heating ink Non-limitative examples of such inkjet printing techniques include thus thermal, acoustic, and piezoelectric inkjet printing. In some examples, the ink composition is jetted onto the recording medium using an inkjet nozzle and/or an inkjet printhead. In some other examples, the ink composition is jetted onto the recording method using thermal inkjet printheads.

In some examples, the method for printing durable inkjet ink images is a high-speed printing method. By high speed, it is meant herein a method capable of printing more than 50 of feet per minute. As an example, the web speed could be from about 50 to about 2000 feet per minute. In some examples, the printing method is well suited for high speeds industrial and for commercial printing. In some other examples, the printing method is well adapted for in-line and high-through put printing applications. In some examples, the printing method is a printing method capable of printing from about 50 to about 1000 feet per minute. In some other examples, the printing method is a printing method capable of printing from about 50 to about 400 feet per minute.

The method encompasses also applying a pre-treatment composition onto a porous recording medium, said pre-treatment composition containing a liquid vehicle, a polyvalent metal salt as fixing agent, a latex resin and a thickener, and applying an ink composition over said pre-treatment composition, wherein the time interval between the finishing point of the application of the pre-treatment composition on the recording medium and the starting point of applying the ink composition is between 1 and 30 seconds; in some other examples, is between 5 and 30 seconds. By "print delay time", it is meant herein the time interval between the finishing point of the application of the pre-treatment composition on the recording medium and the starting point of the application of the ink composition. In some other embodiments, the time interval between the finishing point of the application of the pre-treatment composition on the recording medium and the starting point of the application of the ink composition, i.e., the print delay time is between 5 and 30 seconds. Without being linked by any theory, it is believed that such print delay time, should be sufficient in view of allowing the proper mix of the pre-treatment composition and of the ink composition jetted on it, in view of obtaining a mix that solidifies slowly enough in view of providing a printed image with excellent durability performances. Such print delay time is often dependent on the web speed. For example, for web speeds of 100 fpm or less, the print delay time could be several seconds.

In some examples, the aqueous ink composition is jetted onto a recording medium just after, at least, 5 second of the application of the pre-treatment composition, while the pre-treatment composition is still wet on the recording medium, ensuring a proper mixture between the aqueous ink composition and the pre-treatment composition. In some other examples, at a web speed of 50 fpm, the print delay time between application of the pre-treatment fluid and inkjet printing could be 5 seconds or longer. In yet some other examples, at faster web speeds (more than 50 fpm), the time between pretreatment and printing could be less than 5 seconds.

In some examples, a method for printing durable images onto a recording medium includes applying the pre-treatment composition, such as defined above, onto a porous recording medium using coater or coating devices and jetting an ink composition onto said recording medium via inkjet nozzles, said ink composition including an aqueous liquid vehicle and a colorant. The coater is not particularly limited and can be appropriately selected from known coaters according to the intended use. Examples of coater include an air doctor coater, a blade coater, a rod coater, a knife coater, a squeeze coater, an impregnation coater, a reverse roll coater, a transfer roll coater, a gravure coater, a kiss-roll coater, a cast coater, a spray coater, a curtain coater, and an extrusion coater. Details of the method may be referenced in "Coating Kogaku (Coating Engineering)", by Yuji Harasaki. In some example, the coater is a transfer roll coating device. In order to apply the pre-treatment composition to the recording medium with a uniform thickness, an air-knife may be used for the coating or a member having an acute angle may be positioned with a gap corresponding to the predetermined amount of pre-treatment composition, between the member and the recording medium.

The application of the pre-treatment composition may also be done by any known commercial methods such as gravure, inkjet method, spray coating method, and roller coating method. In some example, the pre-treatment composition is applied by a coating method using rollers. Thus, the pre-treatment composition may be rolled on the recording medium using commercial roll coating equipment. Examples of method for printing durable inkjet ink images onto a recording medium includes thus applying the pre-treatment composition onto the recording medium with rollers or transfer roll coating devices. In some examples, a set of more than 3 rollers can be used. In some other examples, the printing method uses about up to 30 rollers. As an example, within such method, the pre-treatment composition is received onto a first surface, and then a contact is formed between the first surface and a transfer roll. The pre-treatment composition is then transferred from the first surface to the transfer roll. Finally, the pre-treatment composition is transferred from the transfer roller to a print medium. In one approach, the pre-treatment composition is applied to a print recording medium just before the printing of inks by printheads. According to this method, one or several rollers receive the pre-treatment composition and transfer it to a print medium. Thereafter, the print media receives inkjet ink from one or more inkjet printheads.

In some examples, the pre-treatment composition is applied to a recording medium using coating devices and, subsequently, the ink is jetted by inkjet nozzles to record an image. Said inkjet ink composition includes an aqueous liquid vehicle and a colorant, wherein the inkjet ink overprint said pre-treatment composition. In some examples, the ink composition is applied to the recording medium using inkjet nozzles, and is applied after the application of the pre-treatment composition.

In some examples, the printing method may further include a drying process in which the solvent (especially water) present in the ink composition is removed by drying. Thus, in some examples, as a further step, the recording medium is submitted to a hot air drying systems. Alternatively, or in combination with the drying process, a process may be provided in which the solvent in the ink is removed by absorbing the solvent by contacting a roller made of a porous material or the like with the surface of the recording medium. Further, a fixing process may be provided in which the image formed on the recording medium is fixed by at least one of a pressure-application means that applies. In some examples, the ink composition is established on at least a portion of the recording medium to form an image. The pre-treatment composition may be readily applied to the almost entire area of recording side of the recording medium, including an image portion to which ink droplets is to be applied by ink ejection unit. In some example, the pre-treatment composition is established below the ink composition. The amount of pre-treatment composition and/or ink composition used depends, at least in part, on the desirable image to be formed.

In some examples, the ink composition used in the method for printing durable images onto a recording medium is an inkjet ink composition. In some other examples, the ink composition is an aqueous inkjet ink composition. Said ink composition includes an aqueous liquid vehicle and a colorant. In some examples, the colorant is selected from a yellow colorant, a magenta colorant, a cyan colorant and a black colorant, and the ink vehicle includes at least one solvent present in an amount ranging from about 1 to about 25 wt %; at least one surfactant present in an amount ranging from about 0.1 to about 8 wt %; at least one polymer present in an amount ranging from about 0 to about 6 wt %; at least one additive present in an amount up to about 0.2 wt %; and water. The colorant for each ink is selected from a pigment, a dye or combinations thereof. In some examples, the ink contains pigments as colorants. As used herein, "pigment" refers to a colorant particle that is substantially insoluble in the liquid vehicle in which it is used. Pigments can be dispersed using a separate dispersing agent, or can be self-dispersed, having a dispersing agent attached to the surface of the pigment. As used herein, "self-dispersed" generally refers to pigments that have been functionalized with a dispersing agent, such as by chemical attachment of the dispersing agent to the surface of the pigment. The dispersing agent can be a small molecule or a polymer or oligomer. The pigments include both self-dispersed pigments as well as dispersed pigments, e.g., pigments dispersed by a separate dispersing agent that is not covalently attached to the surface. In one example, the pigments are not self-dispersing, and a dispersing aid may be added to the vehicle. In another example, the pigments are self-dispersable and modified to include at least one polymer chemically attached thereto.

As alluded to, pigment colorant can be used in accordance with embodiments of the present disclosure. Specifically, if black is used, the black pigment can be any commercially available black pigment that provides acceptable optical density and print characteristics. Such black pigments can be manufactured by a variety of known methods such as channel methods, contact methods, furnace methods, acetylene methods, or thermal methods, and are commercially available from such vendors as Cabot Corporation, Columbian Chemicals Company, Evonik, Mitsubishi, and E.I. DuPont de Nemours and Company. In addition to black, other pigment colorants can be used, such as cyan, magenta, yellow, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. In some examples, the amount of colorant present in the ink compositions ranges from about 2.0 wt % to about 4.5 wt %. It is to be understood however, that the colorant loading may be more or less, as desired.

As defined herein, an "ink vehicle" refers to the vehicle in which the colorant is placed to form the ink Non-limiting examples of suitable components for the ink vehicle include water-soluble polymers, anionic polymers, surfactants, solvents, co-solvents, buffers, biocides, sequestering agents, viscosity modifiers, surface-active agents, chelating agents, resins, and/or water, and/or combinations thereof. Suitable solvents for the ink vehicle include, but are not limited to glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, Dantocol® DHE (Lonza Inc., Fairlawn N.J.), and/or combinations thereof. In a non-limiting example, the solvents are present in the ink vehicle in an amount ranging from about 1 wt % to about 25 wt %. In some examples, the ink composition includes water. In some examples, water is used as the ink carrier for the composition and is part of the liquid vehicle. In some other examples, the water makes up the balance of the ink composition, and may be present in an amount representing from about 40 to about 90 weight percentages or representing from about 50 to about 80 weight percentages by weight of the total composition.

The surfactants for the ink vehicle can be nonionic or anionic. Suitable nonionic surfactants include, but are not limited to ethoxylated alcohols, fluorinated surfactants, 2-diglycol surfactants, and/or combinations thereof. Specific examples of nonionic surfactants include surfactants from the Surfynol® series (e.g., Surfynol® CT211, Surfynol® SEF), manufactured by Air Products and Chemicals, Inc., in addition to the surfactants (e.g., Tergitol®) provided hereinabove for the aqueous vehicle of the fixer. Non-limiting examples of suitable anionic surfactants for the ink vehicle include those anionic surfactants of the Dowfax® family (e.g., Dowfax® 8390), manufactured by Dow Chemical Company, located in Midland, Mich., or anionic Zonyl® surfactants (e.g., Zonyl® FSA), manufactured by E.I. DuPont de Nemours and Company; phosphate ester surfactants including the surfactants of the Emphos® series and the DeDophoS® series, both manufactured by Witco Corp., Middlebury, the surfactants of the Crodafos® series, manufactured by Croda Inc., Edison, N.J., the surfactants of the Dephotrope® series and of the DePHOS® series, both manufactured by DeForest Enterprises Inc., Boca Raton, Fla.; alkyl sulfates (e.g., lauryl sulfate), alkyl ether sulfates (e.g., sodium laureth sulfate); N-lauroyl sarcosinate; dodecylbenzene sulfonate; and/or combinations thereof. In some examples, the ink vehicle includes one or more surfactants present in an amount up to about 8 wt %, with other non-limiting examples including from about 0.1 wt % to about 6 wt % and from about 1.2 wt % to about 2 wt %.

As a non-limiting example, one class of polymeric binders suitable for use in the ink includes salts of styrene-(meth) acrylic acid copolymers. Suitable non-limiting examples of styrene-(meth)acrylic acid copolymers are commercially available and may be selected from the Joncryl® series (e.g., Joncryl® 586 and 683), manufactured by BASF Corp. located in Florham Park, N.J.; SMA-1000Na and SMA-1440K, manufactured by Sartomer, located in Exton, Pa.; Disperbyk 190, manufactured by BYK Chemicals, located in Wallingford, Conn.; polystyrene-acrylic polymers manufactured by Gifu Shellac, located in Japan; or combinations thereof.

Additives may also be incorporated into embodiments of the ink vehicle for the inks. As a non-limiting example, bactericides, such as Proxel® GXL, may be added to the ink to protect the ink from bacterial growth. Other suitable additives include, but are not limited to, buffers, biocides, sequestering agents, chelating agents, or the like, or combinations thereof. In some examples, the ink vehicle includes one or more additives present in an amount ranging from about 0.1 wt % to about 0.5 wt %. In other examples, no additives are present.

In some examples, the printing method includes the use of the pre-treatment composition as described herein and includes the use of at least an inkjet ink composition selected from a black ink, a yellow ink, a cyan ink, a magenta ink, an orange ink, a red ink, and a green ink In some examples, at least one ink is deposited into individual printheads. Non-limiting examples of suitable printhead configurations include single printheads, dual chamber printheads, tri-chamber printheads and/or the like, and/or combinations thereof. It is to be understood that any number of colored ink compositions may be used in the method such as described herein. Furthermore, any desirable combination of colored inks may be used. For example, each of the colored ink compositions may be of a different color, or two or more of the inks may be different shades of the same color (i.e., light magenta and dark magenta inks). In some examples, four different colored inks can be used: a black ink, a yellow ink, a cyan ink, and a magenta ink In some other examples, the method includes the use of any desirable number of inks selected from black ink, yellow ink, cyan ink, magenta ink, orange ink, red ink, green ink, and/or combinations thereof.

As an example, the pre-treatment composition, including a liquid vehicle, a polyvalent metal salt as fixing agent, a latex resin and thickener, and the ink composition are part of a printing system for printing durable inkjet images. Said printing system includes a pre-treatment composition applicator containing, at least, a transfer roller and a pre-treatment composition, and contains one or several successive inkjet printheads containing inkjet ink composition, said inkjet ink composition including an aqueous liquid vehicle and a colorant. In an example, the inkjet printheads are thermal inkjet printheads. In some examples, the printing system includes a pre-treatment composition applicator containing, at least, a transfer roller and a pre-treatment composition and, at least, four different successive inkjet printheads containing respectively, black, cyan, magenta and yellow inkjet ink compositions. The ink printing system, including the pre-treatment composition of the present disclosure, in addition to black and color inks, presents excellent printing performances and image characteristics.

The preceding description has been presented only to illustrate and describe exemplary embodiments of the present invention. Although certain example methods and compositions have been described herein, the scope of coverage of this patent is not limited thereto. On the contrary, this patent covers all methods, compositions and articles of manufacture fairly falling within the scope of the claims either literally or under the doctrine of equivalents.

EXAMPLES

Ingredients and Abbreviations

Lucidene® 645 is an acrylic urethane polymer available from Rohm & Haas.
LEG-1 is a co-solvent available from Liponics.
Zonyl® FSO is a surfactant available from Dupont Inc.
Cab-O-Jet® 300 is a self dispersed pigment available from Cabot Corporation.
Joncryl® 586 is a styrene-acrylic binder available from BASF Corp.
Proxel® GXL is a biocide available from Arch Chemicals Inc.
Chemguard S-550-L® is a fluorosurfactant available from Chemguard.
BP 700 is a Black Pigment available from Cabot Corp.
Surfynol® DF-210 and Surfynol® DF-220 are defoamers available from Air product.
Byk-018® is a defoamer available from Byk Co.
Rheolate® 212 is a thickener available from Rheox International Inc.
Optiflo® L400 and Optiflo® M2600 VF are thickeners available from Southern Clay products Inc.

Example 1

Preparation of Ink Composition

A black inkjet ink composition is prepared in accordance with TABLE 1 below. All percentages are expressed in percentage by weight (wt %) based on the total weight of the ink composition.

TABLE 1

| Component | Amount (wt %) |
| --- | --- |
| BP 700 Black Pigment | 3.0 |
| Cab-O-Jet ® 300 | 1.0 |
| Joncryl ® 586 | 1.0 |
| 2-Pyrrolidone | 10.0 |
| LEG-1 | 1.0 |
| Zonyl ® FSO | 0.1 |
| Proxel ® GXL | 0.1 |
| Water | Balance |

Example 2

Preparation of Pre-Treatment Compositions

Pre-treatment compositions A to G are prepared in accordance with TABLE 2. All percentages are expressed in percentage by weight (wt %) based on the total weight of the pre-treatment composition.

TABLE 2

| Pre-treatment compositions | A ~ control | B ~ Control | C | D | E | F | G |
| --- | --- | --- | --- | --- | --- | --- | --- |
| Lucidene ® 645 | 33.00% | 36.00% | 36.00% | 36.00% | 33.00% | 36.00% | 36.00% |
| Rheolate ® 212 | — | — | 80% | — | — | — | — |
| Optiflo ® L 1400 | — | — | — | — | — | — | 0.30% |
| Optiflo ® M2600 VF | — | — | — | 0.40% | 0.40% | 0.30% | — |
| Surfynol ® DF-210 | 0.50% | — | — | — | — | — | — |
| Surfynol ® DF-220 | — | 0.2% | 1.00% | — | — | 1.00% | 1.00% |
| Byk-018 ® | — | — | — | 1.00% | 1.00% | — | — |
| 2-Pyrrolidone | 3.00% | 0.00% | 0.00% | 0.00% | 0.00% | 0.00% | 0.00% |
| Calcium Chloride | 7.00% | 4.50% | 4.50% | 4.50% | 5.50% | 4.50% | 4.50% |
| Chemguard ® S550L | 0.10% | 0.00% | 0.00% | 0.00% | 0.00% | 0.00% | 0.00% |
| Proxel ® GXL | 0.10% | 0.10% | 0.10% | 0.10% | 0.10% | 0.10% | 0.10% |
| Water | balance | balance | balance | balance | balance | balance | balance |

TABLE 3 below illustrates the viscosity (in cps) and the surface tension (in dynes/cm) of pre-treatment compositions A to G. The viscosity is measured using a Brookfield viscometer with viscosity measurements in cps and the surface tension is measured using a Kruss K11 Tensiometer with measurements in dynes/cm. The K11 Tensiometer uses a metal plate that is immersed in the pre-treatment composition. The force of the fluid on the plate when held in the fluid is recorded as the surface tension.

TABLE 3

|  | A | B | C | D | E | F | G |
|---|---|---|---|---|---|---|---|
| viscosity | 44 | 75 | 1548 | 3840 | 2352 | 2090 | 1006 |
| surface tension | 26.50 | 33.57 | 32.40 | 38.40 | 37.86 | 33.18 | 32.71 |

Example 3

Pre-Treatment Compositions Performances

Pre-treatment compositions A to G (such as illustrated in TABLE 2) are evaluated for their printing performances, specifically for their durability resistances. Pre-treatment compositions A to G are tested in combination with the black ink illustrated in example 1 (such as illustrated in TABLE 1). The results are illustrated in TABLE 4.

Pre-treatment compositions A to G are rolled on with an industrial coating fixture on media using a forward roll coating. An identical image sequence is printed with black ink having formulation such as illustrated in Example 1, using a HP T-300 web press. The coat weight for a roll-on pre-treatment is 2 grams/sq meters. 10 grams/sq meters of black ink is then printed on top of each pre-treatment formulation. The web speed for the printing process is 100 fpm; the print delay time is 1 seconds. The media used is a porous media, "White Kraft" (White-Top Kraft liner, WTKL) having a white outer facing, obtained by bleaching the outer ply.

Resistance tests are then performed onto the printed media. The "dry rub resistance" refers to the ability of a printed image to resist appearance degradation upon rubbing the image. Good rub resistance, upon rubbing, will tend not to transfer ink from a printed image to surrounding areas where the ink has not been printed and the black optical density (KOD) will be maintained.

Different abrasion tests are made:

"Sutherland Dry Eraser Rub Tests" are performed with an eraser by applying the rub 5 seconds and 1 minute after the print leaves the dryer. The rub tests are conducted with a soft pencil eraser tip and a pressure of between 5 to 7 lbs. The eraser tip is rubbed over the newly pretreated, printed, and dried surface for comparison of immediate drying and durability performance. This same test is used within seconds (1-5) of printing completed and up to 5 minutes after printing is complete.

A "Taber Eraser Rub test" is performed with a Taber Linear Abrader using a hard #10 eraser with a 350 g weight 24 hours after printing. Two cycles are made with the hard eraser in the black area fill print. The KOD is measured before and after the rub. The Taber process shows more handling and abrasion effects on the sample. This test represents the heavy contact between the sample and finishing equipment (i.e. folders, staplers, inserting equipment.)

A "Wet Rub test" is performed with Taber Linear Abrader using a wet wipe on the rubbing tip. One cycle with a two inch long stroke is rubbed on the print with 350 g of pressure.

For each print, before and after the test, the black optical density (KOD) is measured using an X-Rite densitometer to measure the reflectance of the area filled. The higher the KOD value, the darker the black colored image obtained. Black optical density changes of the print media samples are then evaluated (Δ KOD). The numbers herein refer to the difference in optical density (Δ KOD) that has been measured. (The smaller the number is, the better the performance is).

TABLE 4

| Pre-treatment compositions | KODΔ Wet Rub | KODΔ Eraser Rub | KODΔ Sutherland Dry rub |
|---|---|---|---|
| A | 0.72 | 0.16 | 0.09 |
| B | 0.37 | 0.25 | 0.15 |
| C | 0.06 | 0.03 | 0.06 |
| D | 0.22 | 0.09 | 0.00 |
| E | 0.23 | 0.22 | 0.08 |
| F | 0.12 | 0.09 | 0.19 |
| G | 0.18 | 0.02 | 0.06 |

The results demonstrate that the comparative pre-treatment compositions A and B, when applied onto the media, do not mix adequately with inkjet composition applied on top of it, to form a durable film Printed images resulting from the use of pre-treatment compositions A and B present poor durability performances. On the contrary, pre-treatment compositions C to G, when applied onto the media, mix adequately with inkjet composition, form a durable film and result on printed media having good durability and printing performances.

The invention claimed is:

1. A pre-treatment composition, for use in a wet on wet printing method for printing durable images, comprising:
    a. a liquid vehicle,
    b. a polyvalent metal salt as a fixing agent,
    c. an anionic latex resin having a glass transition temperature($T_g$) ranging from −22° C. to +20° C., and
    d. a thickener of a copolymer prepared from a polyhydric alcohol and a monoethylenically unsaturated monoisocyanate.

2. The pre-treatment composition according to claim 1 wherein the composition further comprises a defoamer.

3. The pre-treatment composition according to claim 1 wherein the composition has a viscosity in the range of about 100 to about 10 000 cps.

4. The pre-treatment composition according to claim 1 wherein the composition has a surface tension in the range of about 30 to about 45 dynes/cm.

5. The pre-treatment composition according to claim 1 wherein the thickener represents from about 0.01% to about 2% by weight of the total weight of the pre-treatment composition.

6. The pre-treatment composition according to claim 1 wherein the anionic latex resin has an Acid Number of less than 20.

7. The pre-treatment composition of claim 1 wherein the anionic latex resin is present in an amount representing from about 10 wt % to about 60 wt % of the total weight of the pre-treatment composition.

8. The pre-treatment composition according to claim 1 wherein the fixing agent is a polyvalent metal salt selected from the group consisting of calcium chloride, calcium nitrate, magnesium nitrate, magnesium acetate, and zinc acetate.

9. The pre-treatment composition according to claim 1 wherein the fixing agent is calcium chloride or calcium nitrate.

10. A wet on wet printing method for printing durable images onto a porous recording medium, comprising:
   a. applying a pre-treatment composition onto said porous recording medium, said pre-treatment composition comprising a liquid vehicle, a polyvalent metal salt as a fixing agent, an anionic latex resin and a thickener of a copolymer prepared from a polyhydric alcohol and a monoethylenically unsaturated monoisocyanate; and
   b. applying an ink composition onto said porous recording medium, said ink composition comprising an aqueous liquid vehicle and a colorant, wherein the ink composition overprints said pre-treatment composition while said pre-treatment composition is wet;
   wherein the anionic latex resin has a glass transition temperature ($T_g$) ranging from −22° C. to +20° C.

11. The printing method of claim 10 wherein the pre-treatment composition is applied onto said porous recording medium using coating devices and wherein the ink composition is jetted onto said porous recording medium via inkjet nozzles.

12. The printing method of claim 10 wherein a time interval between a finishing point of the application of the pre-treatment composition on the porous recording medium and a starting point of the application of the ink composition is between 1 second and 30 seconds.

13. The printing method of claim 10 wherein a print speed of the printing method ranges from about 50 fpm to about 2000 fpm.

14. The pre-treatment composition of claim 2 wherein the defoamer is a dispersion of a mineral oil in paraffin solvents and is present in an amount ranging from about 0.01% to about 2% by weight of the total weight of the pre-treatment composition.

15. The pre-treatment composition of claim 1 wherein the anionic latex resin is an acrylic polyurethane copolymer.

16. The pre-treatment composition of claim 1, further comprising a fluorinated surfactant or a fluorinated nonionic surfactant present in an amount up to about 1.5 wt % of the total weight of the pre-treatment composition.

17. A pre-treatment composition, for use in a wet on wet printing method for printing durable images, comprising:
   a liquid vehicle;
   a polyvalent metal salt as a fixing agent;
   an anionic latex resin; and
   a thickener of a copolymer prepared from a polyhydric alcohol and a monoethylenically unsaturated monoisocyanate;
   wherein:
      the thickener represents 0.3% to 0.8% by weight of the total weight of the pre-treatment composition;
      the anionic latex resin is an acrylic polyurethane copolymer that represents 36% by weight of the total weight of the pre-treatment composition;
      the pre-treatment further comprises a defoamer that represents 1% of the pre-treatment composition;
      the pre-treatment composition has a viscosity in the range of about 1000 cps to about 4000 cps; and
      the pre-treatment composition has a surface tension in the range of about 30 dynes/cm to about 38 dynes/cm.

* * * * *